(12) United States Patent
Diehl et al.

(10) Patent No.: US 8,578,855 B2
(45) Date of Patent: Nov. 12, 2013

(54) ROCKET MOTOR TUBE WITH SAFETY FEATURES

(75) Inventors: Matthew D. Diehl, St. Albans, VT (US); Eric Michael Schneck, Burlington, VT (US); Gregory Norman Bogan, Milton, VT (US)

(73) Assignee: General Dynamics Armament and Technical Products, Inc., Charlotte, NC (US)

( * ) Notice: Subject to any disclaimer, the term of this patent is extended or adjusted under 35 U.S.C. 154(b) by 905 days.

(21) Appl. No.: 12/545,494

(22) Filed: Aug. 21, 2009

(65) Prior Publication Data

US 2011/0044751 A1 Feb. 24, 2011

(51) Int. Cl.
*F42B 15/10* (2006.01)

(52) U.S. Cl.
USPC ........... 102/377; 102/469; 102/470; 60/200.1

(58) Field of Classification Search
USPC .................. 102/377, 469, 470; 60/200.1
See application file for complete search history.

(56) References Cited

U.S. PATENT DOCUMENTS

| | | | | | |
|---|---|---|---|---|---|
| 3,927,791 | A | * | 12/1975 | Hershberger | 220/89.4 |
| 4,114,369 | A | * | 9/1978 | Crowley | 60/200.1 |
| 5,036,658 | A | * | 8/1991 | Tate | 60/253 |
| 5,155,298 | A | * | 10/1992 | Koontz | 102/481 |
| H1144 | H | * | 3/1993 | Cherry et al. | 60/39.1 |
| 5,311,820 | A | * | 5/1994 | Ellingsen | 102/481 |
| 5,394,803 | A | * | 3/1995 | Mort | 102/377 |
| 5,398,498 | A | * | 3/1995 | Mort et al. | 60/223 |
| 5,735,114 | A | * | 4/1998 | Ellingsen | 60/39.1 |
| 5,959,235 | A | * | 9/1999 | Wagstaff | 102/202 |
| 6,321,656 | B1 | * | 11/2001 | Johnson | 102/377 |
| 6,338,242 | B1 | * | 1/2002 | Kim et al. | 60/204 |
| 6,363,855 | B1 | | 4/2002 | Kim | |
| 6,619,029 | B2 | | 9/2003 | Solberg et al. | |
| 6,752,085 | B2 | * | 6/2004 | Roach | 102/481 |
| 6,819,510 | B1 | * | 11/2004 | Devenyi | 359/826 |
| 7,051,511 | B2 | * | 5/2006 | Prytz | 60/223 |
| 7,150,231 | B2 | * | 12/2006 | Olofsson | 102/481 |
| 7,322,295 | B1 | * | 1/2008 | Haeselich | 102/470 |
| 7,331,292 | B1 | * | 2/2008 | Kim et al. | 102/481 |
| 7,472,653 | B1 | * | 1/2009 | Hays et al. | 102/481 |
| 8,082,846 | B2 | * | 12/2011 | Cook et al. | 102/377 |
| 8,322,286 | B2 | * | 12/2012 | Toreheim et al. | 102/469 |
| 8,356,727 | B2 | * | 1/2013 | Traxler et al. | 220/745 |

* cited by examiner

*Primary Examiner* — Michelle Clement
(74) *Attorney, Agent, or Firm* — Hunton & Williams LLP

(57) ABSTRACT

A vessel, such as a rocket motor tube, comprised of an insert, and a joint that allows the insert to decouple from the vessel to relieve pressure when subjected to excessive temperatures and/or a predetermined temperature or temperature range.

9 Claims, 7 Drawing Sheets

ROCKET MOTOR TUBE WITH SAFETY FEATURES

TECHNICAL FIELD

The present embodiments relate generally to pressure vessels and, more particularly, to rocket motor tubes, having features that decouple to vent pressure when the vessel is subjected to excessive temperatures.

BACKGROUND

Some pressure vessels, including munitions, may be inherently dangerous. Due to those potential inherent dangers, and the grave effects an accident or unplanned incident involving munitions can have, the U.S. Government has promulgated insensitive munitions standards ("IM Standards") to ensure that munitions operate safely and predictably. These standards require munitions—ammunition, rockets, missiles, explosives, or their shipping containers—to reliably fulfill performance, readiness, and operational requirements on demand, while minimizing the hazards of inadvertent initiation triggered by excessive temperature. Rockets are an example of munitions that must comply with U.S. Government IM Standards.

A rocket motor is a pressure vessel that is propelled by a rearward discharge of gas generated by the combustion of propellant inside the motor. A rocket motor typically includes a casing or motor tube, frequently called a combustion chamber, partially filled with combustible material, and an exhaust nozzle. The combustible material that fuels the rocket is typically a single liquid or solid propellant, but can be a combination of combustible materials and oxidizers.

When designed to comply with IM standards, rockets are expected to (1) enhance survivability by reducing the potential for collateral damage to logistic and tactical combat systems, (2) minimize accidental personnel injury, and (3) provide for more cost effective and efficient transport, storage and handling. IM standards set forth tests and test procedures to assess the safety and characteristics for all non-nuclear munitions, munitions subsystems, and explosive devices, including rockets.

Until now, efforts to design rockets that satisfy IM standards have had limited success. Some attempts involved designing a rocket motor that includes an insensitive munitions charge. For example, Solberg et al. in U.S. Pat. No. 6,619,029 disclose an insensitive munitions charge located inside of the motor casing to auto-ignite and release gas at a temperature below the primary propellant grain auto-ignition temperature. Other attempts have involved an ordnance venting system. For example, Kim et al. in U.S. Pat. No. 6,363,855 disclose a deflagrating composition with a high energy material that detonates during cook-off to rupture the ordnance housing to relieve pressure. Still other attempts have involved a thermoplastic warhead adapter. For example, Kim et al. in U.S. Pat. No. 6,338,242 disclose a thermoplastic adapter that is fitted over a dome plug located in a vent hole of the motor casing that melts away at elevated temperatures to relieve pressure.

While these and other efforts to design munitions and rockets that satisfy mandated IM standards have been made, those efforts have not created munitions that fully satisfy the need for both reliable operation and cost effective production. There remains a need to provide munitions with improved features that potentially enhance safety or that reliably meet IM standards.

SUMMARY OF THE EMBODIMENTS

In a first exemplary embodiment, a decoupling assembly is provided. The decoupling assembly may be used in munitions. It may include a rocket motor tube having an open end, the motor tube containing a temperature-sensitive combustible material. The decoupling assembly may further include a mount incorporating a seat for a flexible seal to close and seal the open end of the motor tube, and a joint between the motor tube and the mount. The joint may be configured and dimensioned to allow the mount to decouple from the motor tube and comprises a material that softens when exposed to predetermined temperatures.

In another exemplary embodiment, a vessel is provided. The vessel may include a body defining an internal cavity, the cavity containing a temperature-sensitive material. The vessel may further include an insert and a material forming a joint between the body and the insert. The material may create a conditionally secure attachment, where the joint permits the insert to become displaced from the body when external temperatures cause the pressure inside the vessel to increase, thereby allowing the contents to escape in a controlled manner and the pressure to be reduced.

In another exemplary embodiment, a decoupling assembly is provided that may be installed in a plumbing network containing temperature sensitive material. The decoupling assembly may include a housing having an open end. The decoupling assembly may further include an insert closing the open end of the housing, the insert comprising a seat adapted to receive a seal, and a joint between the insert and the housing, the joint being configured and dimensioned to receive a material that softens at a predetermine temperature to allow the insert to decouple from the housing.

BRIEF DESCRIPTION OF THE DRAWINGS

Advantages of the exemplary embodiments will be apparent to those of ordinary skill in the art from the following detailed description and the accompanying drawings, in which like reference numerals are used to indicate like elements.

DESCRIPTION

Figure 1:
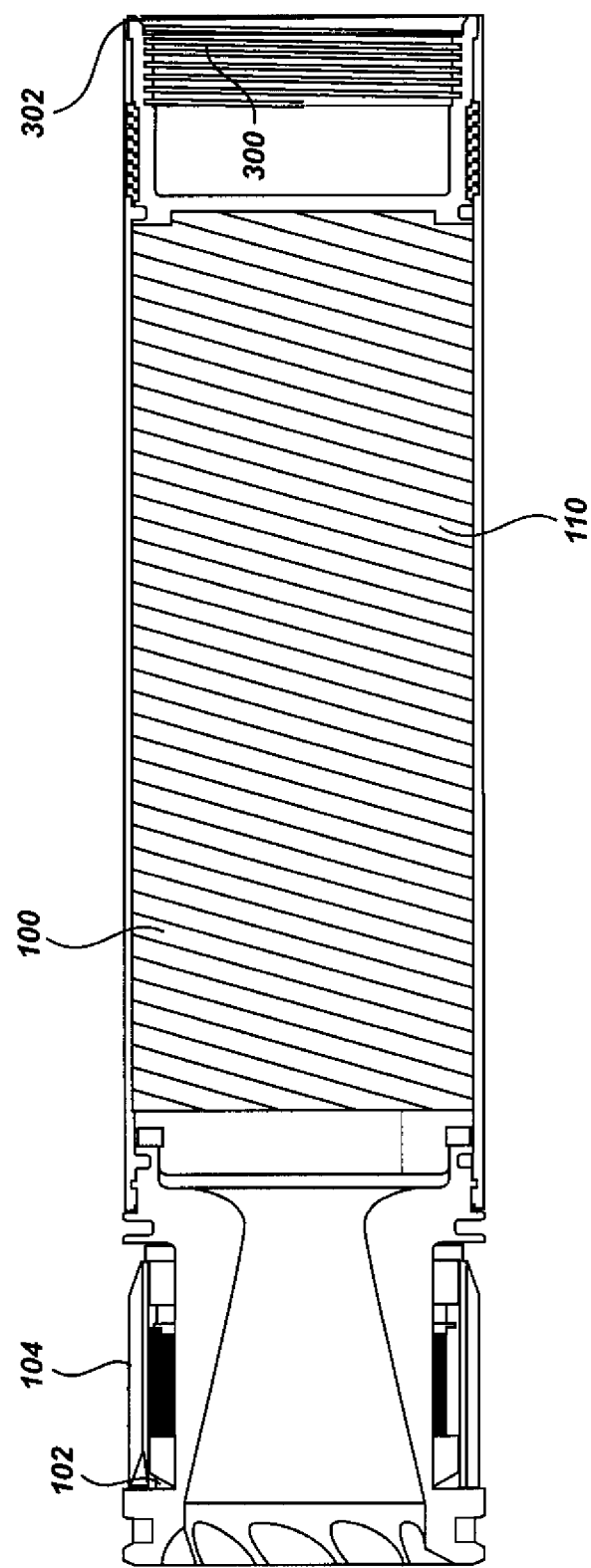
FIG. 1 is a cross-sectional side view of a rocket motor, according to one embodiment of the present disclosure.

The following description conveys an understanding of embodiments that relate generally to vessels, such as munitions, and more particularly to a rocket motor having features that relieve pressure when subjected to excessive temperature and/or a predetermined temperature. Numerous exemplary embodiments of vessels having features that comply with IM standards are described below. Rockets, and other munitions, described by the exemplary embodiments that meet IM standards are not limited to only those embodiments, however. For example, exemplary embodiments may be used for temperature dependent decoupling in devices, machines, or vehicles outside of the munitions industry. The exemplary embodiments may be sized or shaped differently, in any suitable manner, and may be adapted to add components not described, or to remove components. One possessing ordinary skill in the art will appreciate the exemplary embodiments' use for purposes and benefits in alternative forms and industries, depending upon specific design needs and other considerations. It will also be understood that embodiments are not required to satisfy IM Standards and may be designed to satisfy alternative standards, or may be used in applications without required standards.

Terminology used in this description is for describing particular embodiments only and is not intended to limit the scope of an exemplary embodiment. As used throughout this disclosure, the singular forms "a," "an," and "the" include the plural, unless the context clearly dictates otherwise. Thus, for example, a reference to "a seal" includes a plurality of seals, or other equivalents or variations known to those skilled in the art. Furthermore, if in describing some embodiments or features permissive language (e.g., "may") is used, that does not suggest that embodiments or features described using other language (e.g., "is," "are") are required. Unless defined otherwise, all terms have the same commonly understood meaning that one of ordinary skill in the art to which this invention belongs would expect them to have.

The accompanying figures and following description depict and describe exemplary embodiments of a vessel with features that decouple the structure of the vessel when subjected to excessive temperatures and/or a predetermined temperature. These features are believed sufficient to satisfy IM Standards, but such satisfaction is not a requirement of all exemplary embodiments. As used throughout this description, the term "rocket" or other like terms is meant to encompass any vessel designed with the features described herein. But, the exemplary embodiments may also be used in any munitions, devices, machines, or vehicles, regardless of whether they are specifically designed to comply with IM standards. The vessels are not limited to any specific embodiment or detail that is disclosed.

With regard to the exemplary embodiments of the rocket motor tube described below, any part that fastens, inserts, attaches, or connects any component to or from the rocket motor tube is not limited to any particular type and is instead intended to encompass all known and conventional fasteners, like screws, nut and bolt connectors, threaded connectors, snap rings, detent arrangements, clamps, rivets, toggles, and so on. Fastening may also be accomplished by other known fitments, like leak-tight seals or sealing devices. Components may also be connected by adhesives, polymers, copolymers, glues, welding, ultrasoninc welding, and friction fitting or deformation. Any combination of these fitment systems can be used.

Unless otherwise specifically disclosed, materials for making components of the present invention may be selected from appropriate materials, such as metal, metal alloys, natural or manmade fibers, composites, vinyl, plastics, silicone, rubber, and so on. Any and all appropriate manufacturing or production methods, such as casting, pressing, extruding, molding, machining, may be used to construct the exemplary embodiments or their components.

When describing exemplary embodiments, any reference to relative position (front and back or rear, top and bottom, right and left, upper and lower, and so on) is intended to conveniently describe those embodiments only. Positional and spacial references do not limit the exemplary embodiments or its components to any specific position or orientation.

As shown in FIG. 1, an exemplary motor tube 100 for a rocket is depicted. Attached to the rear end of the motor tube 100 may be a nozzle 102. As is known in the art, the nozzle 102 may have fins 104, or any other directional stabilizing component, attached to it. In one embodiment, the nozzle 102 may be a converging-diverging nozzle and extend rearwardly from the motor tube 100. The nozzle 102 may be a conical, ideal, or bell nozzle but is not limited to any particular shape, number of parts or components, or overall construction. The nozzle 102, and its components, such as the fins 104, may be made of a metallic material that is removably or permanently attached to the motor tube 100 by a lockwire or any other known or suitable means. The nozzle 102 may act as the primary means through which gas produced in the motor tube 100, sometime referred to as a combustion chamber, is permitted to escape, generating thrust. Although a rocket's performance can be highly dependent on the particular design and shape of a nozzle, any rocket nozzle, such as the rocket nozzle 102 shown in FIG. 1, or a plurality of nozzles, may be used in other embodiments.

In the exemplary embodiment, the motor tube 100 may be an elongated, tubular body having a constant or varying diameter. The motor tube 100 may serve has a housing or body for containing a combustible material. The motor tube 100 may comprise a single, integral tube structure but can alternatively be formed from multiple pieces or components joined together. The motor tube 100 may be machined, formed, or otherwise constructed to meet particular specifications. For example, the motor tube 100 may have a specific length, outside diameter, wall thickness(es), inside diameter, straightness, or surface finish. In an exemplary embodiment, the motor tube 100 may have a length of about 37.25±0.25 in., an outside diameter of about 2.750 in., a wall thickness of about 072+0.004/−0.002 in., an inside diameter of about 2.6060±0.0060 in., a mean of the maximum and minimum diameters of about 2.6060±0.0045, and a minimum surface finish of about 125 μin. Of course, these dimensions can be substantially different depending of the type of munitions or rockets being manufactured. As mentioned above, the motor tube 100 may be constructed of multiple pieces or components, and in that embodiment, each piece or component may have identical or different measurements.

The tube 100 may be constructed from a metallic material. In one embodiment, the motor tube 100 may comprise a rigid tube of aluminum, specifically aluminum alloy 7075 ("Alloy 7075"). Alloy 7075 is one of the 7XXX series alloys frequently used in aircraft, aerospace, and munitions structures and components. Alloy 7075 is an Al—Zn—Mg—Cu high strength alloy having the beneficial effects of chromium to develop good stress-corrosion cracking resistance in sheet products. Alloy 7075 is available in bare and alclad sheet and plate product forms, and in the annealed state as well as several tempers of the T6, T73 and T76 types.

In the exemplary embodiments above, the motor tube 100 is described as being an aluminum alloy. This, however, is an exemplary embodiment only. The motor tube 100 may be made of any suitable material, including other aluminum alloys, or other high-strength and corrosion-resistant materials, like stainless steel, magnesium, titanium, composites, fiber reinforced composites, plastics, and so on. The motor tube 100 may further comprise one or more internal components 110 that are known in the art, such as a spring, heat shield, igniter assembly, and so on.

Figure 2:
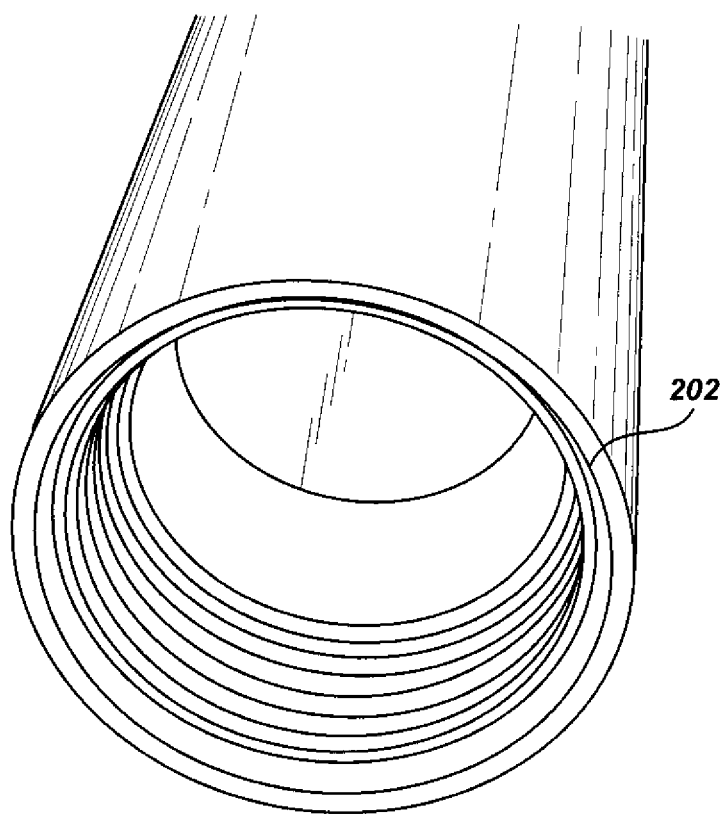
FIG. 2 is a front end view of a motor tube, according to one embodiment of the present disclosure.

Referring to FIGS. 1 and 2 the motor tube 100 has a front end 202 and a rear end (not shown). The rear end may provide an interface with which the nozzle 102, as described above, is attached by any suitable means. The front end 202 may provide an interface within which an insert (described below) is attached.

Figure 3:
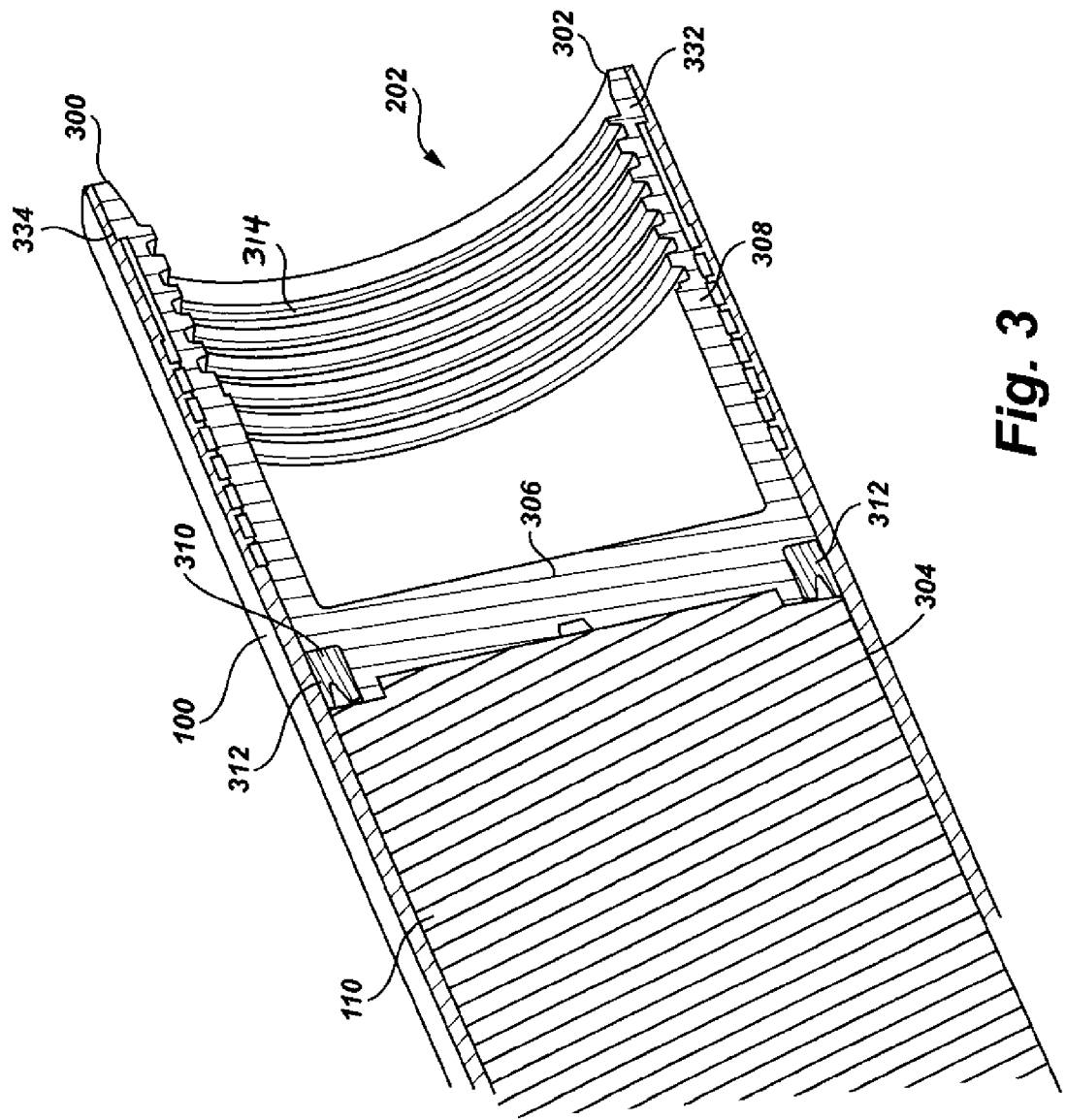
FIG. 3 is a perspective view of the cross-section of a portion of a rocket motor with safety features, according to one embodiment of the present disclosure.

Referring to FIG. 3, the front end 202 of the motor tube 100 may have an insert 300 attached thereto. The insert 300 may be inserted concentrically inside of the motor tube 100 so that the outside face of the insert 300 contacts the inside face of the motor tube 100. The insert 300 may be generally cup-shaped with a front end 302 and a rear end. The insert 300 may further comprise a base 306 from which a sidewall 308 extends axially towards the front end 302. The sidewall 308 may terminate in a common plane with the front end 202 of the motor tube 100. Further, the sidewall 308 may have a tapered end 332 that mates with a corresponding seat 334 near the front end of the motor tube 100. It should be understood, however, that either the sidewall 308 or the front end 202 may terminate in a more forward plane than the other. The sidewall 308 may be of any suitable thickness. In another embodiment, the insert 300 may be adapted to be received over the motor tube 100.

The insert 300 may be adapted to receive a warhead (not shown). As different tactical requirements may demand different types of warheads. The insert 200 may be designed such that any suitable warhead may be attached to the motor tube 100. The insert 300 may comprise a number of threads 314 formed on the inside surface of the sidewall 308 for receiving a warhead. Such constructions are well known in the art. Other constructions may be used, however, to attach a warhead to the insert 300, such as screws, nut and bolt connectors, threaded connectors, snap rings, detent arrangements, clamps, rivets, toggles, seals or sealing devices.

In the exemplary embodiments, the insert 300 may be constructed of any suitable material. For example, the insert 300 may be the same material as the motor tube 100, such as Alloy 7075, or it may be any other material, including material that is dissimilar from that used for the motor tube 100

Figure 4:
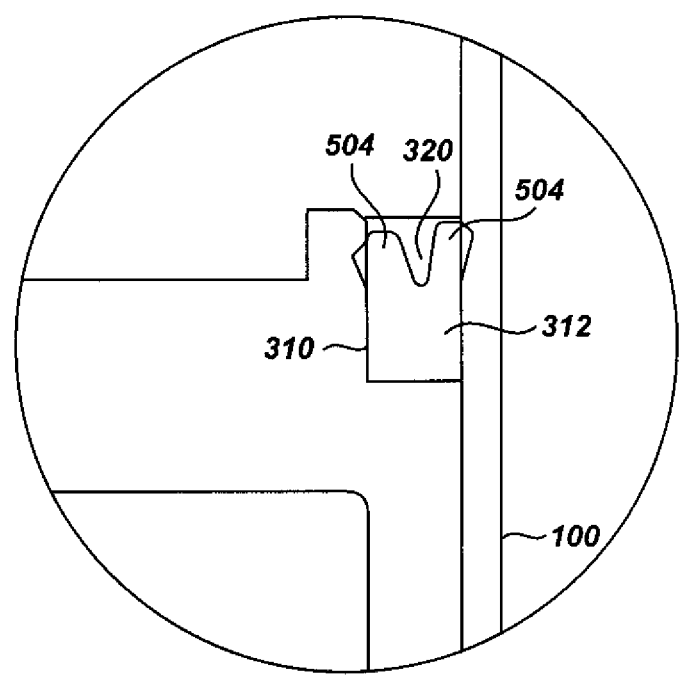
FIG. 4 is a cross-sectional view of a seal between a motor tube and an insert, according to one embodiment of the present disclosure.

As mentioned above, the insert 300 includes the base 306. The base 306 may comprise a seal seat 310 formed on its bottom surface as an annular ring to receive a seal 312. The seal 312 may sit inside or partially inside the seal seat 310. Referring to FIG. 4, the seal 312, in one embodiment, may be a piston U-cup seal. The seal 312 has a u-shaped groove 320 formed in such a manner that a seal is made by inside and outside sealing lips 504. The inside and outside sealing lips 504 contact the inside sidewall of the seal seat 310 and the inside wall of the motor tube 100, respectively. The seal 312 may be designed with differently shaped sealing lips 504. For example, the U-Cup seal may have a shorter, heavier outside sealing lip to achieve a higher initial sealing force on the motor tube 100. The seal 312 is supported by the bottom surface of the seal seat 310. In an exemplary embodiment, the seal 312 may be designed to withstand up to 5000 psi, but it is not so limited and the seal 312 may be designed to withstand any pressure depending on expected operating conditions.

The seal 312 may be produced using a variety of flexible materials, typically polymers or elastomers, made with a variety of geometries. For example, the seal 312 may be manufactured in a variety of geometries, in a range from 2"-8" outside diameter, using fluorocarbon, polyacrylate, ethylene acrylic, or other polymers. The seal 312 may be manufactured using precision cutting processes, casting, molding, or other manufacturing methods well known in the art. Of course, the geometry and material used for the seal 312 may be varied to ensure an appropriate sealing contact. One skilled in the art can determine the appropriate type, design, and material needed for the seal 312 depending on the expected temperatures and pressures, and other operating conditions. Further, the seal 312 may be made with any suitable hardness and fluid compatibility.

In another embodiment, the seal seat 312 may be formed in and around the outer circumference of the base 306, as opposed to being provided in the shown seal seat 310. It should be noted, however, that any type of construction may be used to create a sealing mechanism or the base 306 itself may be constructed to create a suitable seal. The base 306 may be any suitable thickness. Moreover, the seal 312 may be substituted with any type of sealing mechanism, such as a lip seal, mechanical seal, o-ring, shaft seal, two-part seal, or any other suitable seal. Such seals are well known in the art.

Figure 6:
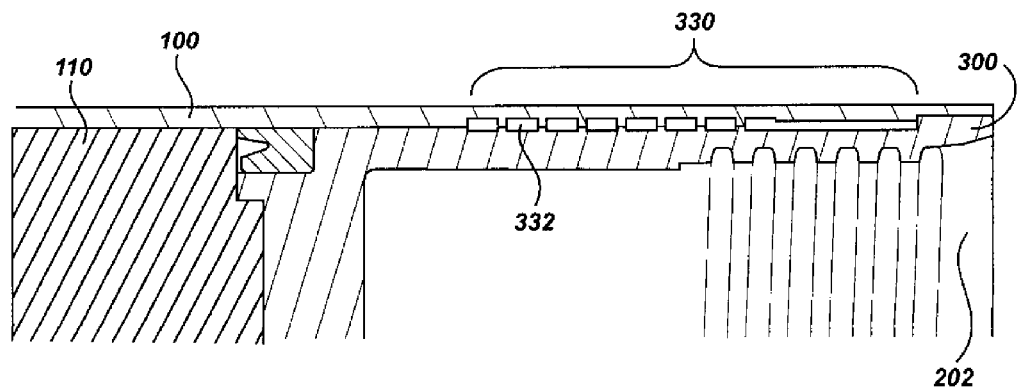
FIG. 6 is a portion of a side view of the cross-section of a portion of a motor tube, according to one embodiment of the present disclosure.

Referring to FIG. 6, the motor tube 100 may include a joint 330. The joint 330 provides a mechanism by which a vessel, such as a rocket motor tube, can decouple when the vessel is subjected to excessive temperatures and/or a predetermined temperature. In an exemplary embodiment, the joint 330 may soften to allow the insert 300 to decouple from the motor tube 100. The joint 330 may be used in pressurized or non-pressurized vessels. In other words, the joint 300 may allow the insert 300 to decouple before or after a vessel becomes pressurized. Furthermore, the present embodiments may be used in normally pressurized vessels.

The joint 330 may be formed between the insert 300 and the motor tube 100 to securely retain the insert 300 in place. The motor tube 100 and the insert 300 may be constructed with one or more circumferential grooves or projections or reliefs in the form of annular rings 332 to receive a material, which serves to conditionally secure the insert 300 to the motor tube 100. Alternatively, the motor tube 100 and the insert 300 may have a stub ACME thread form to engage the material into the joint 330. The one or more annular rings 332 may be formed to provide a slot-like void for injecting the material. In one embodiment, the joint 330 may have eight annular rings. One of ordinary skill in the art can readily determine the number, width, and depth of annular rings needed to alter the shear area of the bonded joint as needed to provide the retention strength needed for a given application.

In another embodiment, as described above, the insert 300 may be adapted to be received over the motor tube 100. In other words, the insert 300 may serve as a mount to the motor tube 100. In that embodiment, the joint 330 may be inverted such that the joint 330 may be formed on the outside of the motor tube 100.

To create the joint 330, a material, including a wide range of natural and synthetic materials suitable, may be injected. In one embodiment, the material may be plastic or polymer, such as a high density polyethylene (HDPE) resin. This thermoplastic may have a variety of compositions, including additives or fillers. For example, the joint 330 may comprise a chemically coupled HDPE resin reinforced with glass fiber.

Table 1 shows an exemplary HDPE resin used in the joint 330:

TABLE 1

| | HDPE resin | | |
|---|---|---|---|
| | English | SI Metric | ASTM TEST |
| PROPERTIES & AVERAGE VALUES OF INJECTION MOLDED SPECIMENS | | | |
| PERMANENCE | | | |
| Primary Additive | 40% | 40% | |
| Specific Gravity | 1.26 | 1.26 | D 792 |
| Molding Shrinkage ⅛ in (3.2 mm) section | 0.0020-0.0030 in/in | 0.20-0.30% | D 955 |
| MECHANICAL | | | |
| Impact Strength, Izod notched ⅛ in (3.2 mm) section | 3.0 ft-lbs/in | 160 J/m | D 256 |
| unnotched ⅛ in (3.2 mm) section | 15.0 ft-lbs/in | 801 J/m | D 4812 |
| Tensile Strength | 9000 psi | 62 MPa | D 638 |
| Tensile Elongation | 4.0-5.0% | 4.0-5.0% | D 638 |
| Tensile Modulus | $1.25 \times 10^6$ psi | 8619 MPa | D 638 |
| Flexural Strength | 13500 psi | 93 MPa | D 790 |
| Flexural Modulus | $1.00 \times 10^6$ psi | 6895 MPa | D 790 |
| THERMAL | | | |
| Ignition Resistance* Flammability** | HB @ 1/16 in | HB @ 1.5 mm | D 635 |
| GENERAL PROCESSING FOR INJECTION MOLDING | | | |
| Injection Pressure | 10000-15000 psi | 69-103 MPa | |
| Melt Temperature | 380-450° F. | 193-232° C. | |
| Mold Temperature | 70-150° F. | 21-66° C. | |
| Drying | 2 hrs @ 175° F. | 2 hrs @ 79° C. | |

PROPERTY NOTES
Data herein is typical and not to be construed as specifications
Unless otherwise specified, all data listed is for natural or black colored materials. Pigments can affect properties.
*This rating is not intended to reflect hazards of this or any other material under actual fire conditions.
**Values per RTP Company testing.

It should be understood that one of ordinary skill in the art can determine the crystallinity, molecular weight, and other chemical and physical properties depending on the maximum and minimum operating or exposure conditions of the motor tube 100. Alternatively, the HDPE resin, or other plastic or material, may be reinforced with another substance, such as basalt fiber, carbon black, clay, talc, calcium carbonate, mica, silica, or silicate, or other suitable fillers. The material used in the joint may also comprise any suitable non-plastic material.

As described above, the motor tube 100 and insert 300 may be constructed with annular rings 332 to receive an injected material, such as an HDPE resin. In one embodiment, eight annular rings may be formed to distribute the load in the HDPE as the internal pressure of the motor tube 100 changes. This helps ensure that the insert remains securely in place during normal operation.

One or more injection ports (not shown) may be machined into the motor tube 100 at any suitable location so that material, such as HDPE, may be injected into the annular rings; for example, two injection ports of about 0.1 inch diameter may be used and located 180° apart and about 1.5 in. from the front end 202 of the motor tube 100.

Figure 5:
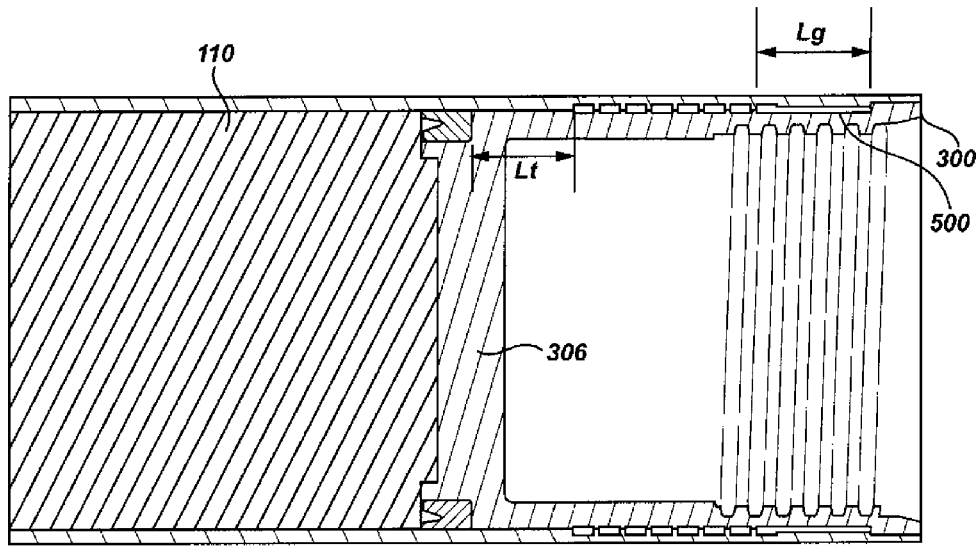
FIG. 5 is a side view of the cross-section of a portion of a motor tube, according to one embodiment of the present disclosure.

Referring to FIG. 5 or 6, the annular rings 332 may be constructed, formed, machined, or molded along the outer surface of the insert 300 and/or the inner surface of the motor tube 100. In one embodiment, the annular rings are aligned crest-to-crest, so that the roots align and fill with the largest possible amount of continuous material. In other words, the motor tube 100 and the insert 300 may comprise one or more reliefs projecting into a surface thereof.

Each of the annular rings 332, formed as distinct elongated grooves, define a slot-like void between the insert 300 and the motor tube 100. As noted above, the annular rings 300 provide a space for the injected material to flow into and solidify, thus establishing the joint 330 between the insert 300 and motor tube 100. As shown for example in FIG. 7, the plurality of annular rings 332 may be formed as distinct elongated grooves spaced equi-distantly around the circumference of the insert 300. The annular rings 332 may be arranged, however, as continuous grooves around the circumference of the insert 300. The annular rings may further be formed with an angle on each ring cut, referred to as angled cuts 802, as shown in FIG. 8. The angled cuts 802 help to ensure proper compression of the material injected between the motor tube 100 and the insert 300. The angle cut 802 on each annular ring 332 may be configured to optimize joint performance.

In alternative embodiments, the shape, orientation, depth, and placement of the annular rings 300 may be varied. If necessary, symmetrically and asymmetrically spaced and shaped cavities, notches, pockets, grooves, and so on may be used. Alternatively, any other orientation, positional and spacial relationship can be used, such as a staggered arrangement in the radial or axial direction. The foregoing arrangement may be desirable to ensure that the injected material securely joins the insert 300 inside of the motor tube 100.

In an exemplary embodiment, the annular rings 332 may be placed at a predetermined distance from one another, and a predetermined distance from the seal 312. Referring back to FIG. 5, a length $L_t$, as measured from the seal 312 to the nearest annular ring 332, may be about 0.01 in. to about 1 in., more preferably about 0.79 in. Of course, these distances can be changed as certain designs may dictate.

Figure 7:
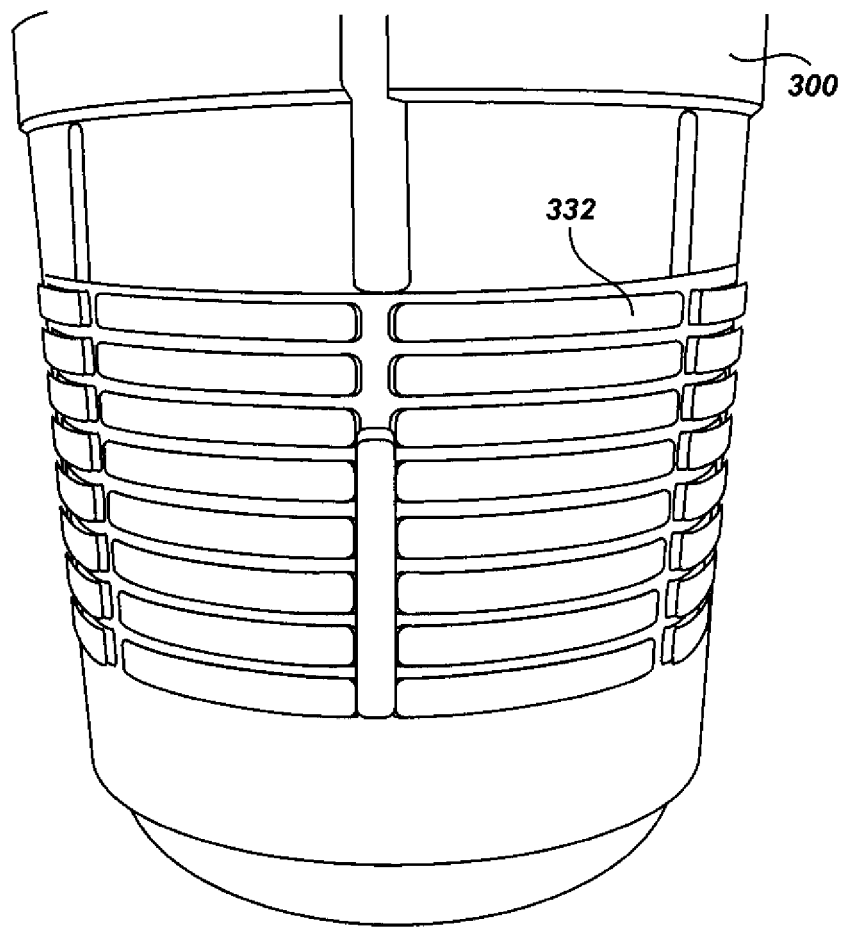
FIG. 7 is a perspective view of an insert for a motor tube, according to one embodiment of the present disclosure.
Figure 8:
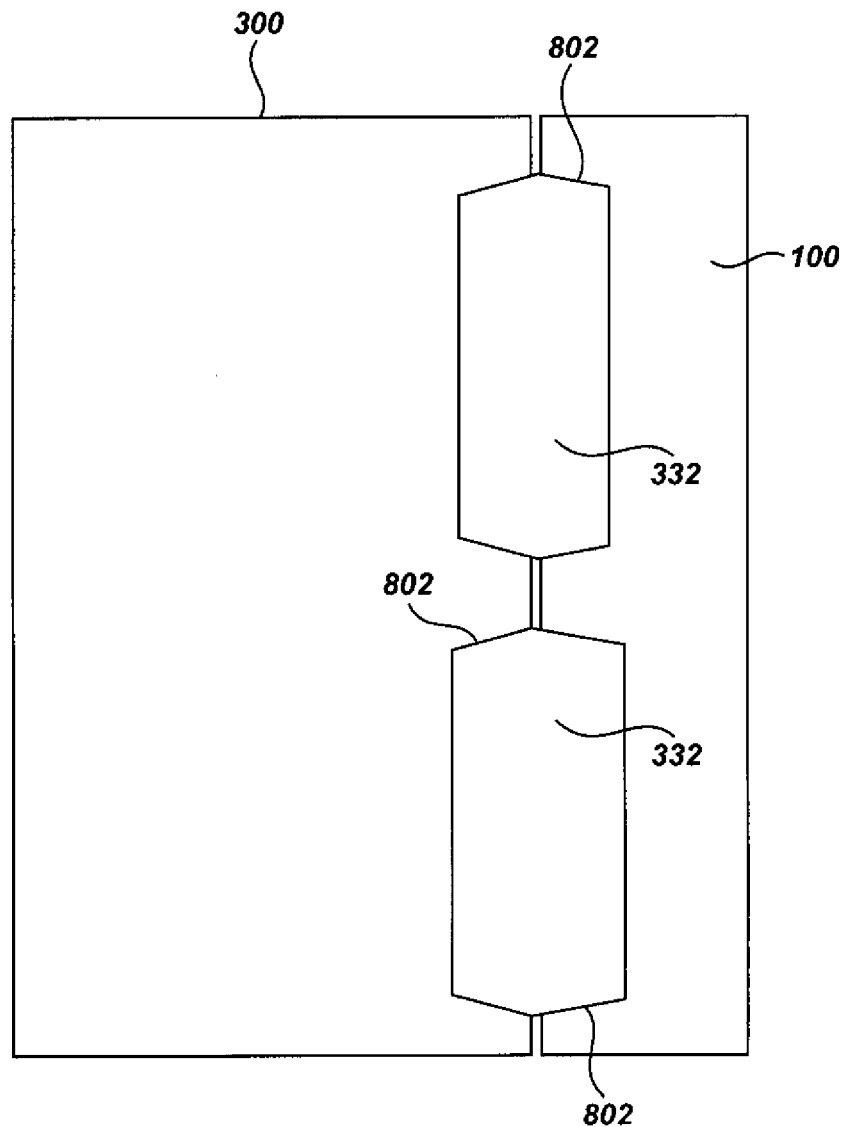
FIG. 8 is a cross-sectional view of a portion of the joint constructed in a motor tube, according to one embodiment of the present disclosure.

Referring to FIG. 5 and FIG. 7, the motor tube 100 and insert 300 may further comprise one or more axially aligned grooves 500. The one or more axial grooves 500 serve as an anti-torque feature to help ensure that the insert 300 does not rotate and remains securely attached to the motor tube 100 as the warhead is being screwed in place or removed. The one or more grooves 500 may be designed to meet certain warhead installation and removal requirements. For example, the grooves 500 may be designed to meet a requirement to withstand about 55±20 ft-lb and may be designed to withstand repeated warhead installations and removals. The grooves 500, however, can be designed to any specific requirement. In one embodiment, the motor tube 100 may have twelve axially aligned grooves 500, or channels, machined between the distinct elongated grooves that comprise the annular rings 300. In an exemplary embodiment, the grooves 500 length $L_g$ measured of about 0.25 in. to about 1 in., more preferably about 0.53 in. These axial grooves 500 may also provide a fluid path between the annular rings 332 to help facilitate thorough implantation of the injected material.

A vessel, once fully assembled in accordance with the present embodiments, preferably has features that fulfill performance requirements but also can reduce the risk that the vessel explodes when it is subjected to excessive temperatures and/or a predetermined temperature. One objective of a rocket assembled according to the present embodiments is to relieve the vessel before the auto-ignition temperature of the propellant contained within the rocket is reached. This occurs as the joint 330, as described above, reaches a predetermined temperature and softens prior to reaching the auto-ignition temperature of the propellant, causing the insert 300 to decouple from the motor tube 100. While this function is preferred, it is not a necessary feature of all embodiments. The predetermined temperature or temperature range at which the joint softens may be varied depending on the material used in the joint 330 and/or the material used as the propellant. One skilled in the art can readily determine what temperature or temperature range at which the insert 300 will decouple from the motor tube 100.

In certain circumstances, it may be important for motor tubes to pass certain tests, such as a hydroburst test, static fire test, vibration test and slow cook-off test (e.g., a test at temperatures above 300° F.) to ensure compliance with different specifications. One or more of those tests or others may be necessary to comply with IM standards. As such, exemplary embodiments may satisfy one or more requirements in addition to decoupling the insert 300 before reaching the auto-ignition temperature. For example, it has been found that exemplary embodiments configured as a Mk66 motor have been able to satisfy the additional tests identified above by demonstrating that the Mk66 motor reduced the explosive results when the propellant reached slow cook-off temperatures above 300° F., while still meeting the performance requirements to function as a rocket motor.

This disclosure describes exemplary embodiments of vessels, including munitions and rocket motor tubes, that have features to relieve pressure when subjected to excessive temperatures and/or a predetermined temperature. Those embodiments may be used in a rocket system, such as a 2.75" rocket motor and warhead system. However, it will be understood that the foregoing embodiments may be used in any rocket motor tube, warhead system, pressure vessel or in other devices, machines, or vehicles outside the munitions industry. Additionally, it will be understood that these and other embodiments are capable of use in various other combinations and environments and can be changed or modified without departing from the scope of the appended claims.

What is claimed is:

1. A decoupling assembly for use in munitions, the decoupling assembly comprising:
    a motor tube having an open end, the motor tube containing a temperature-sensitive combustible material;
    a mount adapted to close and seal open end of the motor tube; and
    a joint between the motor tube and the mount, the joint being configured and dimensioned to allow the mount to decouple from the motor tube,
    wherein at least one of the motor tube and the mount comprises one or more annular rings formed circumferentially on a surface thereof to define a void,
    wherein the joint comprises a joint material disposed within the void defined by the one or more annular rings, the joint material being selected so as to be injectable into and set within the void defined by the one or more annular rings and so dint, it softens when exposed to a predetermined temperature,
    wherein the motor tube comprises one or more injection ports in communication with the one or more annular rings, the one or more injection ports being configured to allow injection of the joint material into the void defined by the one or more annular rings, and
    wherein the at least one of the motor tube and the mount further comprises one or more axially aligned grooves formed on the same surface or surfaces as and intersecting with the one or more annular rings.

2. The decoupling assembly of claim 1, wherein the motor tube is adapted to internally receive the mount.

3. The decoupling assembly of claim 2, wherein at least a portion of the one or more annular rings are formed on an interior surface of the motor tube.

4. The decoupling assembly of claim 2, wherein at least a portion of the one or more annular rings are formed on an exterior surface of the mount.

5. The decoupling assembly of claim 1, wherein the mount comprises a seat adapted to receive a seal.

6. The decoupling assembly of claim 1, wherein the motor tube and the mount each have one or more annular rings formed circumferentially on a surface thereof, and wherein each of the one or more rings on the motor tube is aligned with a corresponding one of the one or more rings on the mount.

7. The decoupling assembly of claim 1, wherein the joint material comprises a polymer having a reduced mechanical strength when exposed to the predetermined temperature.

8. The decoupling assembly of claim 1, wherein the joint material comprises a high density polymer reinforced with glass fiber.

9. The decoupling assembly of claim 1, wherein the one or more annular rings is a plurality of rings and the one or more axially aligned grooves intersects each of the plurality of rings to provide a fluid path between the rings.

* * * * *

UNITED STATES PATENT AND TRADEMARK OFFICE
CERTIFICATE OF CORRECTION

| | | |
|---|---|---|
| PATENT NO. | : 8,578,855 B2 | Page 1 of 1 |
| APPLICATION NO. | : 12/545494 | |
| DATED | : November 12, 2013 | |
| INVENTOR(S) | : Matthew D. Diehl | |

It is certified that error appears in the above-identified patent and that said Letters Patent is hereby corrected as shown below:

In the Claims

In claim 1, column 10, line 8, delete "dint," and insert therefore --that--

Signed and Sealed this
Eighteenth Day of March, 2014

Michelle K. Lee
*Deputy Director of the United States Patent and Trademark Office*